(12) United States Patent
Birenheide

(10) Patent No.: US 11,535,147 B2
(45) Date of Patent: Dec. 27, 2022

(54) LOCKING BAR

(71) Applicant: WISTRA Gmbh CARGO CONTROL, Selmsdorf (DE)

(72) Inventor: Christian Birenheide, Berkenthin (DE)

(73) Assignee: WISTRA Gmbh CARGO CONTROL, Selmsdorg (DE)

( * ) Notice: Subject to any disclaimer, the term of this patent is extended or adjusted under 35 U.S.C. 154(b) by 286 days.

(21) Appl. No.: 17/024,930

(22) Filed: Sep. 18, 2020

(65) Prior Publication Data
US 2021/0078480 A1 Mar. 18, 2021

(30) Foreign Application Priority Data
Sep. 18, 2019 (EP) ..................................... 19198085

(51) Int. Cl.
B60P 7/15 (2006.01)
(52) U.S. Cl.
CPC ..................................... B60P 7/15 (2013.01)
(58) Field of Classification Search
CPC ..... B60P 7/15; E05C 5/00; E05C 1/12; E05B 27/00
USPC ............... 410/143; 292/251.5, 333, 332, 337
See application file for complete search history.

(56) References Cited

U.S. PATENT DOCUMENTS

| 4,249,761 A | 2/1981 | Nishimura | |
| 7,695,031 B2* | 4/2010 | Jackson, Jr | E05C 5/00 |
| | | | 292/65 |
| 8,376,420 B2* | 2/2013 | Peterlunger | E05C 19/165 |
| | | | 292/DIG. 4 |
| 10,081,969 B2* | 9/2018 | Alexander | E05B 83/28 |
| 2005/0268432 A1 | 2/2005 | Migli | |

FOREIGN PATENT DOCUMENTS

| DE | 699 32 046 T2 | 12/2006 |
| DE | 20 2019 100 808 U1 | 5/2019 |

OTHER PUBLICATIONS

European Patent Office Search Report dated Mar. 24, 2020 for EP Application No. 19198085.3 (7 pp.).

* cited by examiner

*Primary Examiner* — D Glenn Dayoan
*Assistant Examiner* — Sunsurraye Westbrook
(74) *Attorney, Agent, or Firm* — Crowell & Moring LLP

(57) ABSTRACT

A locking bar for a load securing system with lashing points includes at least two telescopic sections which are linearly movable to one another and two end fittings which are arranged at ends of the locking bar which are opposite one another, each for engaging into a lashing point, and a spring element which is arranged in the locking bar, is coupled to the telescopic sections and is designed to force the telescopic sections into an extended position. The locking bar includes a locking unit which is designed to releasably arrest the telescopic sections in the retracted position for the insertion of the locking bar into two lashing points which are opposite one another.

20 Claims, 2 Drawing Sheets

LOCKING BAR

RELATED APPLICATION

This application claims the benefit of, and priority to, European Patent Application No. 19198085.3, filed Sep. 18, 2019, which is incorporated by reference herein in its entirety.

TECHNICAL FIELD

The present disclosure relates to a locking bar for a load securing system with lashing points, comprising at least two telescopic sections which are linearly movable to one another.

BACKGROUND

For securing loads in vehicles, load securing systems are known in various embodiments. Lashing points which are provided on the vehicle and which permit the receiving or tensioning of lashing belts and nets, locking bars and the like are used in widespread load securing systems. Herewith, the load can be held tightly in the vehicle and be secured from slipping. For this, locking bars in known embodiments comprise end-side fittings which are each inserted into an opening of a lashing point, so that the locking bar preferably extends transversely (horizontally or vertically) to two vehicle walls which delimit the respective space of the vehicle and which are distanced to one another. The locking bars often have a changeable length for adapting to different widths of the vehicle interior and for permitting the insertion. Typically, the locking bars are telescopable counter to a spring force and consist of two telescopic hollow profiles which are arranged in one another. Each one of the fittings is located at their ends, between which fittings a spring force is active in the extension direction.

A difficulty on using such a locking bar can lie in the fact that its length in the relaxed state is greater than the distance between the vehicle walls. On account of this, the locking bar must be set obliquely into a first lashing point and be pressed together amid the permanent overcoming of the spring force, so that it can be inserted into an oppositely arranged second lashing point. Given relatively high spring forces which are inherent of the construction type, this can be quite exhausting for the user and could moreover lead to a scratching or to damage to one of the vehicle walls.

It is the object certain aspects herein to provide a locking bar for a load securing system with lashing points which is as simple as possible to release or fasten, combats damage to the vehicle walls, but despite this can accommodate high forces.

BRIEF DESCRIPTION OF THE DRAWINGS

Certain embodiments are hereinafter explained in more detail by way of an embodiment example which is represented in the drawing. There are shown in.

DETAILED DESCRIPTION

Figure 1A:
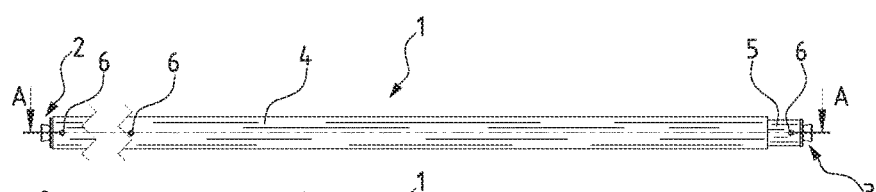
FIGS. 1a and 1b a lateral view and a sectioned view of a locking bar in a retracted position, FIGS. 2a and 2b a lateral view and a sectioned view of a locking bar in an extended position, FIGS. 3a and 3b a part-section of the locking bar and the locking element which is contained therein, in the retracted position (FIG. 3a) and in the extended position (FIG. 3b) and FIG. 4 a schematic plan view onto a vehicle space with lashing points and with a locking bar which is arranged therein.

In one aspect, a locking bar for a load securing system with lashing points comprises at least two telescopic sections which are linearly movable to one another and two end fittings which are arranged at ends of the locking bar which are opposite one another, for engaging into a lashing point, and a spring element which is arranged in the locking bar, is coupled to the telescopic sections and is designed to force the telescopic sections into an extended position. In some embodiments, the locking bar comprises a locking unit which is designed to releasably arrest the telescopic sections in the retracted position for the insertion of the locking bar into two lashing points which are opposite one another.

The lashing points can be for example openings in vehicle walls or in a rail system which is integrated into vehicle walls. The shape of the openings is of no significance to the subject-matter of all embodiments. Apart from circularly round openings, polygonal openings, oval openings, openings which are continuous or comprise a web can also be used. Other positive-fit means which permit a positive connection to end fittings are also conceivable. One can imagine providing a locking bar for different, standardized or manufacturer-specific systems. The lashing points are provided for creating a fixed, positive connection between the locking bar and a vehicle structure.

The end fittings are designed complementarily to the lashing points. They can each engage into a lashing point and by way of this create a positive connection. The positive connection can also relate to the engagement into an undercut. For this, hook-like, cone-shaped or elongate end fittings can be used.

The two telescopic sections permit a simple length change by way of them being displaceable relative to one another. In particular, the two telescopic sections are arranged in one another and consequently comprise an outer and an inner hollow profile. The spring element could preferably be arranged within both telescopic sections, so that it is protected from damage. The spring element could be realized for example as a gas compression spring, spiral spring or the like.

As described herein, the locking bar typically includes a locking unit. The two telescopic sections can be arrested in a retracted position which preferably corresponds to the state of the smallest length of the locking bar. The insertion of the locking bar into two lashing points which are opposite one another is greatly simplified by the small length. A user can firstly change the length of the locking bar by way of pushing together the telescopic sections into the retracted position and arrest the locking bar. Herewith, the handling in the inside of the vehicle is significantly simplified since the locking bar is more manageable and there is less danger of a vehicle wall becoming damaged on moving the locking bar. In the retracted position, the locking bar can be inserted in a manner in which it is aligned transversely to a vehicle wall, into a lashing point which is located therein, in order after releasing the locking unit to lead the other end fitting into an opposite lashing point. On insertion, on account of the arresting the user consequently no longer needs to manually compensate the possibly quite high spring force and can lead an extending locking bar into the related lashing point in a much easier manner.

It is particularly advantageous if the spring element comprises the locking unit. The arresting of the spring element makes sense since the spring element determines the length of the locking bar in the absence of external influence. By way of this, a faulty gripping and possible jamming of the telescopic sections can be prevented. The locking element is furthermore protected from contamination or damage.

The spring element preferably comprises a movably mounted spring rod which is displaced out of a spring housing by a spring force, wherein the spring housing and the spring rod comprise a bi-stable latching mechanism as a locking unit. Such a latching mechanism is in the position of assuming two different latching positions which are each inherently stable. By way of coupling to the telescopic sections, these are likewise situated in a stable state in both latching positions. A stable state is particularly preferably reached in the retracted position and encompasses an arresting of the spring rod. Another stable state can also be achieved for example by way of the spring element being able to act freely upon the telescopic sections and by way of this the length of the locking bar changing up a maximum which is inherent of the construction type.

It is advantageous if the spring element is designed to arrest the telescopic sections by way of pressing together the telescopic sections into a retracted position and to release the arresting by way of renewed pressing together of the telescopic sections in the retracted position. The locking unit is then similar to the mechanics of a ball-point pen, which are technically mature and can be scaled in an arbitrary manner. The operation of the locking unit and consequently the arresting of the locking bar become very simple by way of this, since it does not demand the use of separate mechanics.

The spring element particularly preferably comprises a gas compression spring. Gas compression springs can provide a high power density and high spring forces and can further influence the speed of the movement which is caused by the spring force. Furthermore, given a restricted construction space, large displacement paths given a low progression are possible in comparison to a helical spring.

The telescopic sections can be designed in a hollow-cylindrical manner. The spring element as a result can be accommodated in both telescopic sections, which is conducive to a centering of the spring element for centering the center of gravity, so that the handling of the locking bar is simplified. Furthermore, hollow-cylindrical telescopic sections provide more construction space for the integration of the spring element, so that the manufacture of the locking bar is inexpensive on account of the ability to use commercially available spring elements.

In a particularly preferred embodiment, the spring element is damped. In particular, this can be achieved on using a gas compression spring which comprises a movable piston with a through-flow opening whose size determines the damping effect.

FIG. 1a shows a telescopic locking bar 1, i.e. one which is changeable in length L, in a retracted position. The locking bar 1 is designed for a load securing system with lashing points which is integrated in a vehicle and for this at one end comprises a first end fitting 2 and at an opposite end a second end fitting 3. A first telescopic section 4 is designed as a tube in which a second telescopic section 5 is inserted in a displaceable manner. The second telescopic section 5 is likewise designed by way of example as a tube. The length L of the locking bar 1 can be changed within limits by way of displacing the second telescopic section 5 in the first telescopic section 4. The distance of the end fittings 2 and 3 is changed by way of this. The locking bar 1 becomes more manageable and can be inserted into the lashing points in a simpler manner by way of reducing the length L. By way of increasing the length L, the positive connection to the lashing points is made possible. At the same time, an adaptation to different vehicle widths is carried out.

Figure 1B:
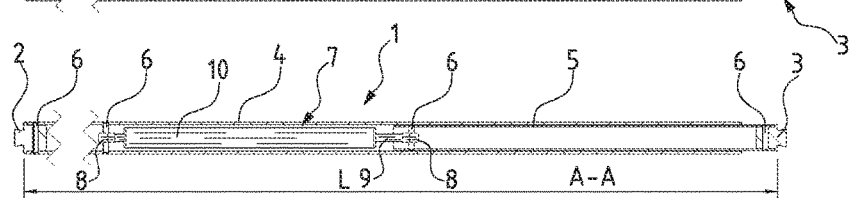

FIG. 1b shows the locking bar 1 in a sectioned representation A-A whose position and alignment is specified in FIG. 1a. The end fittings 2 and 3 by way of example are indicated as separately manufactured elements which are each inserted into a free end of the first telescopic section 4 or the second telescopic section 5 and are secured there with a transverse pin 6. The end fittings 2 and 3 can each comprise an elongate projection on an outwardly facing side. This, as is shown by way of example, can widen to the outside. Herewith, the end fittings 2 and 3 can be inserted into a lashing point which is realized as an opening, in order to engage into opening edges of the lashing point.

A spring element 7 which on both sides comprises an eye, a yoke or another fitting element 8 is arranged in the inside of the first telescopic section 4. One of the fitting elements 8 is herein connected to the first telescopic section 4 and one to the second telescopic section 5. For simplifying the construction of the locking bar, this could likewise be effected in each case via a transverse pin 6 which projects through the respective fitting element 8 and is fastened in the respective telescopic section.

The spring element 7 by way of example is a gas compression spring and comprises a spring housing 10 as well as a spring rod 9 which is mounted therein in a linearly displaceable manner. This spring rod usually comprises a plunger which is not shown in more detail here. The spring element 7 is designed to displace the spring rod 9 out of the spring housing 10 by way of gas pressure. As a result, the second telescopic section 5 is displaced out of the first telescopic section 4 by way of the connection of the spring element 7 to the telescopic sections 4 and 5. The locking bar 1 therefore always urges into a state of a greater length.

A particularity of the spring element 7 here lies in the fact that a locking unit which is not shown in detail here is provided there. This unit is designed to arrest (lock) the two telescopic sections 4 and 5 in a retracted position. In this example, the locking unit is designed in a manner such that the telescopic sections 4 and 5 are arrested by way of pushing together the telescopic sections 4 and 5 into retracted position and subsequently letting go. By way of renewed pressing together of the telescopic sections 4 and 5 in this position, the arresting or locking is released again. Consequently, the locking bar 1 can be arrested in its retracted position according to the ball-point pen principle. Given an arrested locking bar 1, a user can consequently insert the first end fitting 2 or the second end fitting 3 into a lashing point and release the arresting by way of pressing together the telescopic sections 4 and 5, so that the locking bar 1 lengthens again by way of the spring force of the spring element 7.

Figure 2A:
Figure 2B:
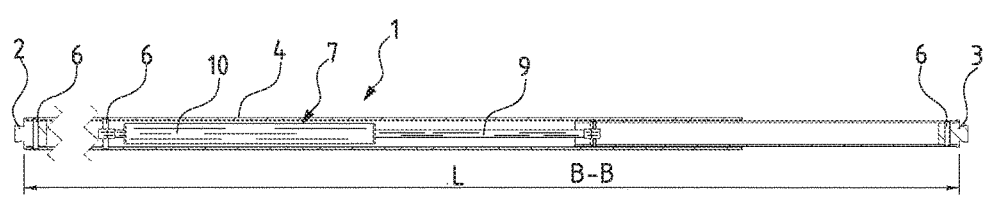

This is shown in the FIGS. 2a and 2b. Here, the second telescopic section 5 is extended significantly out of the first telescopic section 4, so that a length L of the locking bar 1 is increased. It is particularly useful to design the spring element 7 with a damper, so that a soft extension movement is effected after the release of the arresting. This could be effected by way of a suitably dimensioned through-flow opening in a piston of the spring element 7 which is designed as a gas compression spring.

Figure 3A:
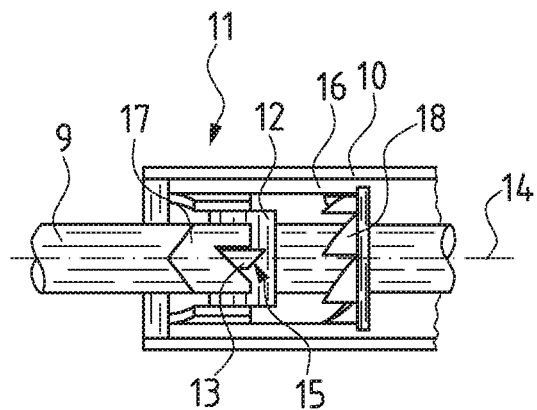
Figure 3B:
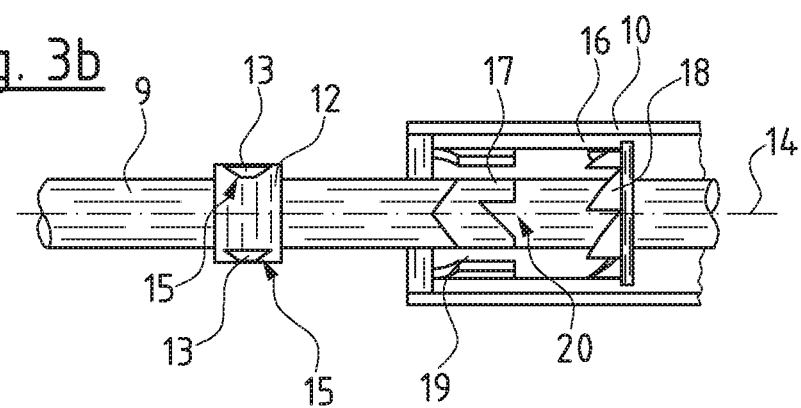

FIGS. 3a and 3b show a part section of the locking bar 1 with an exemplary locking unit 11 which is integrated in the spring element 7. A part of the spring rod 9 which projects out of the spring housing 10 is to be seen in both representations. By way of example, a cam drum 12 is arranged on the spring rod 9 in a rotatable but non-displaceable manner and at the circumferential side is provided with several cams 13 which extend outwards from the cam drum 12 in the radial direction over a certain stretch. The cams 13 by way of example have a trapezoidal base surface which in the circumferential direction of the cam drum 12 comprises two longitudinal edges which are parallel to one another and which are moreover aligned parallel to a longitudinal axis 14 of the spring element 7. Two oblique ramp surfaces 15 which are arranged at the face side are enclosed therebetween.

Meanwhile, a cam sleeve 16 which by way of example is positioned in the proximity of an open end of the spring housing 10 is located in the spring housing 10. The cam sleeve comprises guide elements 17 and an inner toothing 18 which lies further inwards along the longitudinal axis 14. The cam sleeve 16 and the cam drum 12 are arranged concentrically to one another. The cams 13 are shaped such that they can be pushed in the axial direction through guide slots 19 between the individual guide elements 17 of the cam sleeve 16 when they are located axially in front of or behind this. If the cams 13 get through the guide slots 19, then the spring rod 9 can be extended out of the spring housing 10 in an unhindered manner by way of the spring pressure.

If however the spring rod 9 is inserted into the spring housing 10 and the ramps surfaces 15 of the cams 13 after running through the guide slots 19 come into surface contact with the inner toothing 18, then they are deflected on this in the circumferential direction. As a result, the cam drum 12 slightly twists on the inner toothing 18 so that the cams 13 finally get into the arresting deepening 20 after letting go of the spring rod 9. The cams 13 are pressed into the arresting deepening 20 by way of the continuing spring force and are held there in their momentary position in a flush manner. The spring rod 9 then cannot be extended further out of the spring housing 10 and the spring element 7 is consequently arrested. The locking bar 9 as a result of this cannot be extended further.

The cams 13 are again twisted in the circumferential direction by way of a renewed insertion of the spring rod 9 into the spring housing 10, so that they again lie axially in front of the guide slots 19. The arresting of the spring element 7 and accordingly of the locking bar 1 is then released again.

Figure 4:
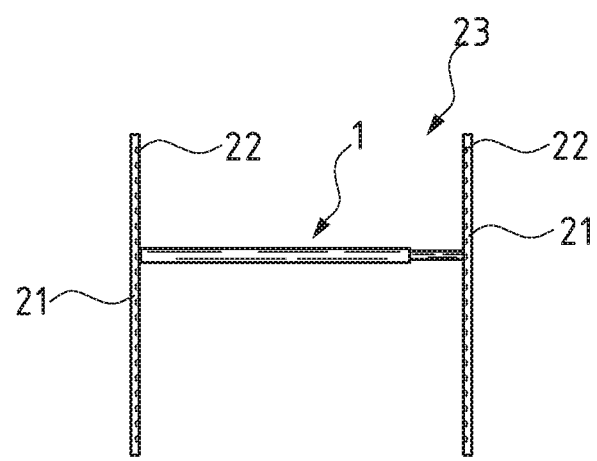

Finally, FIG. 4 shows a plan view of a vehicle space 23 which is delimited to the outside by two vehicle walls 21. Several lashing points 22 which are realized for example in a rail system are located in the vehicle walls 21. The locking bar 1 can be handled quite easily in the vehicle space 23 and be adapted to different widths of different vehicle spaces due to its arrestability.

LIST OF REFERENCE NUMERALS

1 locking bar
2 end fitting
3 end fitting
4 first telescopic section
5 second telescopic section
6 transverse pin
7 spring element
8 fitting element
9 spring rod
10 spring housing
11 locking unit
12 cam drum
13 cam
14 longitudinal axis
15 ramp surface
16 cam sleeve
17 guide element
18 inner toothing
19 guide slot
20 arresting deepening
21 vehicle wall
22 lashing point
23 vehicle interior
L length

We claim:

1. A locking bar for a load securing system with at least two lashing points, comprising:
    at least two telescopic sections which are linearly movable relative to one another and at least two end fittings respectively arranged at ends of the telescopic sections which are opposite to one another, wherein each end fitting is configured for engaging into a lashing point, and
    a spring element coupled to the at least two telescopic sections and having a spring for forcing the telescopic sections into an extended position, and
    a lock configured to releasably arrest the telescopic sections in the retracted position for the insertion of the at least two end fittings into the at least two lashing points.

2. The locking bar according to claim 1, wherein the spring element comprises the spring being mechanically coupled to the lock.

3. The locking bar according to claim 1, wherein the spring comprises a movably mounted spring rod which is displaced out of a spring housing by a spring force, wherein the spring housing and the spring rod comprise a bi-stable latching mechanism as a lock.

4. The locking bar according to claim 2, wherein the spring is configured to arrest the telescopic sections by way of pressing together the telescopic sections into a retracted position, and to release the arresting by way of renewed pressing together of the telescopic sections in the retracted position.

5. The locking bar according to claim 1, wherein the spring comprises a gas compression spring.

6. The locking bar according to claim 1, wherein the telescopic sections are designed in a hollow-cylindrical manner.

7. The locking bar according to claim 1, wherein the spring is damped.

8. A locking bar, comprising:
    a first telescopic section and a second telescopic section, wherein the first telescopic section is linearly movable relative to the second telescopic section;
    a first end fitting and a second end fitting, wherein the first end fitting is arranged at a first end of the locking bar and the second end fitting is arranged at a second end of the locking bar, the first end being opposite the second end,
    wherein the first end fitting is configured for engaging a first lashing point and wherein the second end fitting is configured for engaging a second lashing point to secure the locking bar in place;
    a spring element comprising a spring coupled to the at least two telescopic sections and such that the first telescopic section and the second telescopic section are include a tendency to assume an extended position; and a lock configured to releasably arrest the telescopic sections in a retracted position such that the first end fitting and the second end fitting are appropriately spaced for insertion into the first lashing point and the second lashing point.

9. The locking bar according to claim 8, wherein the spring element comprises the spring being mechanically coupled to the lock.

10. The locking bar according to claim 9, wherein the spring element comprises a movably mounted spring rod which is displaceable out of a spring housing by a spring force, wherein the spring housing and the spring rod comprise a bi-stable latching mechanism as the lock.

11. The locking bar according to claim 10, wherein the spring element is configured to arrest the telescopic sections by way of pressing together the telescopic sections into a retracted position, and to release the arresting by way of renewed pressing together of the telescopic sections in the retracted position.

12. The locking bar according to claim 8, wherein the spring element comprises a gas compression spring.

13. The locking bar according to claim 8, wherein the first telescopic section and the second telescopic section each include a hollow cylinder, wherein one of the hollow cylinders is slidable within the other.

14. The locking bar according to claim 8, wherein the spring is damped.

15. A method, comprising:
  forming a locking bar, wherein the locking bar includes the following:
  a first telescopic section and a second telescopic section, wherein the first telescopic section is linearly movable relative to the second telescopic section;
  a first end fitting and a second end fitting, wherein the first end fitting is arranged at a first end of the locking bar and the second end fitting is arranged at a second end of the locking bar, the first end being opposite the second end,
  wherein the first end fitting is configured for engaging a first lashing point and wherein the second end fitting is configured for engaging a second lashing point to secure the locking bar in place;
  a spring element comprising a spring coupled to the at least two telescopic sections and such that the first telescopic section and the second telescopic section are include a tendency to assume an extended position; and
  a lock configured to releasably arrest the telescopic sections in a retracted position such that the first end fitting and the second end fitting are appropriately spaced for insertion into the first lashing point and the second lashing point.

16. The method according to claim 8, wherein the spring element comprises the spring being mechanically coupled to the lock.

17. The method according to claim 9, wherein the spring element comprises a movably mounted spring rod which is displaceable out of a spring housing by a spring force, wherein the spring housing and the spring rod comprise a bi-stable latching mechanism as the lock.

18. The method according to claim 10, wherein the spring element is configured to arrest the telescopic sections by way of pressing together the telescopic sections into a retracted position, and to release the arresting by way of renewed pressing together of the telescopic sections in the retracted position.

19. The method according to claim 8, wherein the spring element comprises a gas compression spring.

20. The method according to claim 8, wherein the first telescopic section and the second telescopic section each include a hollow cylinder, wherein one of the hollow cylinders is slidable within the other.

* * * * *